United States Patent [19]
Bellet et al.

[11] Patent Number: 5,873,408
[45] Date of Patent: Feb. 23, 1999

[54] METHOD AND APPARATUS FOR HEAT TREATING SUBSTANCES FLOWING ALONG A DUCT

[75] Inventors: Serge Bellet, Chateauneuf-les-Martigues; Guy Louradour, Montreuil, both of France; Rebecca Paterson, Linlinthtow, Scotland

[73] Assignee: Naphtachimie, La Defense, France

[21] Appl. No.: 843,981

[22] Filed: Apr. 18, 1997

[30] Foreign Application Priority Data

Apr. 24, 1996 [FR] France ................................. 96 05517

[51] Int. Cl.⁶ .................................................. F28D 11/06
[52] U.S. Cl. .............................................. 165/84; 122/379
[58] Field of Search .................... 165/84, 95; 15/104.07; 122/379

[56] References Cited

U.S. PATENT DOCUMENTS

| | | | |
|---|---|---|---|
| 2,183,496 | 12/1939 | Peters | 165/84 |
| 2,365,984 | 12/1944 | Warren | 15/104.07 X |
| 2,550,676 | 5/1951 | Dalin | 165/84 X |
| 3,835,817 | 9/1974 | Tuomaala | 122/379 |
| 4,018,267 | 4/1977 | Tomasicchi | 165/84 |
| 5,238,055 | 8/1993 | Kelley | 165/84 |

FOREIGN PATENT DOCUMENTS

| | | | |
|---|---|---|---|
| 1045678 | 11/1953 | France | 165/84 |
| 1373827 | 8/1963 | France . | |
| 1460316 | 11/1966 | France . | |
| 2725642 | 4/1996 | France . | |
| 560705 | 9/1932 | Germany | 165/84 |
| 59-1999 | 1/1984 | Japan | 165/84 |
| 154299 | 7/1932 | Sweden | 165/84 |
| 449229 | 11/1974 | U.S.S.R. | 165/84 |
| 589533 | 1/1978 | U.S.S.R. | 165/84 |
| 1567861 | 5/1990 | U.S.S.R. | 165/84 |
| 9211931 | 7/1992 | WIPO . | |

*Primary Examiner*—Leonard R. Leo
*Attorney, Agent, or Firm*—Ladas & Parry

[57] ABSTRACT

The technical field of the invention is that of manufacturing heat treatment apparatuses such as furnaces for thermally cracking chemical substances, in particular hydrocarbons. The present invention provides a method of heat treating one or more fluids flowing along a duct including at least one rectilinear tubular portion extending along a longitudinal axis and optionally terminated by at least one bend, and disposed at least in part in a thermal enclosure, in which method, in order to reduce or avoid the deposition of solid particles on the inside wall of said duct, said duct is caused to vibrate by means of a mechanical vibrator which is located outside the thermal enclosure, and which is connected to the duct by mechanical link means; according to the invention, said vibrator exerts a force on said mechanical link means substantially along an axis that is transverse relative to the longitudinal axis of said rectilinear length, and said mechanical link means is fixed to said bend or to said rectilinear length in the vicinity of an end thereof.

11 Claims, 6 Drawing Sheets

METHOD AND APPARATUS FOR HEAT TREATING SUBSTANCES FLOWING ALONG A DUCT

FIELD OF THE INVENTION

The present invention relates to a method and to apparatus for heat treating fluid substances or materials (liquid and/or gaseous) flowing along a hollow body that defines a duct.

The technical field of the invention is that of manufacturing heat treatment apparatus, such as furnaces for thermally cracking chemicals, and in particular hydrocarbons.

The present invention seeks to provide a method and an apparatus for heat treating substances flowing along a tube or duct of a hollow body disposed in a thermal enclosure (e.g. in a furnace including a radiation zone fitted with burners), with the method serving to reduce or avoid deposition of solid particles on the inside wall of the tube or duct along which the fluid flows, such as the deposition of coke when thermally cracking hydrocarbons.

BACKGROUND OF THE INVENTION

International application No. WO 92/11931 (NAPHTACHIMIE et al.), discloses a method of producing chemical substances in which one or more reagents are caused to flow inside a tube disposed in a radiation zone of a furnace, and in which a portion of the tube is subjected to vibration so as to limit deposition of reaction by-products on the inside wall of the tube. That document proposes imparting transverse vibration to the tube at a frequency lying in the range 50 Hz to 2000 Hz by means of a mechanical vibration source which is disposed inside or outside the radiation zone of the furnace, and which is connected to the tube by means of a mechanical link.

That document also describes a furnace, such as a steam cracking furnace, including a radiation thermal enclosure fitted with burners and within which there is disposed a cracking tube that is sinuous in shape, being constituted by a succession of straight sections interconnected by bends. The furnace is provided with excitation means suitable for generating vibration in at least a portion of the tube, which means may be constituted by a mechanical vibration generator connected to the tube by a mechanical link.

OBJECTS AND SUMMARY OF THE INVENTION

The present invention seeks to provide an improved method and apparatus for heat treating one or more fluids flowing in a duct disposed in a thermal enclosure (such as a furnace radiation enclosure).

The invention seeks to provide a method and apparatus for effectively imparting vibration to a tube (or duct) disposed in a thermal enclosure and along which a fluid flows, which method and apparatus are compatible with thermal stresses that can be high due to the high temperatures that obtain within the thermal enclosure, which method and apparatus should be suitable for being implemented industrially and should therefore be capable of being achieved at low cost while being sufficiently reliable and robust, given, in particular, the continuous nature of heat treatment processes which generally require the equipment used to have a long lifetime.

The invention relates in particular to a method of heat treating one or more fluids flowing along a duct which includes at least one rectilinear length of tube extending along a longitudinal axis and optionally terminated by a bend (or curvilinear length or curved portion of tube), and which is disposed at least in part inside a thermal enclosure, in which method vibration is applied to said duct by means of a mechanical vibrator which is disposed outside the thermal enclosure and which is connected to the duct (and/or the rectilinear length of tube) by mechanical link means, thereby serving to reduce or avoid deposition of solid particles on the inside wall of said duct; according to the invention, the mechanical link means is fixed to the bend and/or to the vicinity of an end of said rectilinear length, and a rectilinear portion of the duct is caused to vibrate by means of the force exerted by the vibrator on the mechanical link means along an axis (i.e. a direction) that extends substantially transversely relative to the longitudinal axis of the rectilinear length of tube (forming a rectilinear portion of duct).

Surprisingly, it has been observed that it is possible to obtain vibration, preferably transverse vibration (i.e. associated with bending the rectilinear length of tube), that is sufficiently effective to limit deposition on the inside wall of a rectilinear length of duct, by applying vibration (as generated by the vibrator and transmitted to the duct by means of the mechanical link) to one end of the rectilinear length, even though said end normally corresponds to a vibration node, specifically with respect to transverse modes of vibration for the length, thus making it appear unfavorable to excite the rectilinear length in the vicinity of its end.

The vibrator preferably exerts a force that is linear or axial, i.e. that is directed along a "main" axis (or direction) that does not vary with time. To this end, the vibrator may include a core or weight that is mounted to move in linear translation (along said main axis) on two aligned bearings, and that is driven by the action of a periodic or alternating electromagnetic field. This preferred type of electromagnetic vibrator can be selected from those put on sale by BINDER MAGNETE GmbH (Monchweilerstrasse 1, Postfach 1220, D.7730 Villingen-Schwenningen, Germany).

In accordance with an aspect of the invention, the main axis along which the force is exerted can be inclined relative to the longitudinal axis of the rectilinear length to be vibrated by an angle of more than 45° and less than 135°, and preferably lying in the range 60° to 120°, and in particular being close to 90°.

Said heat treatment process can implement heating and/or cooling means disposed inside the thermal enclosure, and can consequently comprise heating and/or cooling the fluids flowing along the duct through the thermal enclosure.

The vibrator exerts a time-varying force on the mechanical link means, which force is preferably periodic and alternating so as to give rise to movement (or displacement) of the link means (i.e. of the vibration-transmission structure) and of the rectilinear length of tube that varies with time and that is of zero mean value.

The zone(s) in which the mechanical link means is fixed to the duct is/are situated in the vicinity of one end of said rectilinear length of tube or optionally to a bend fixed to said end, which fixing zone extends inside or outside said enclosure. Said link means is preferably fixed to said duct at a distance from said end which is such that the ratio of said distance to the length of said rectilinear length of tube is less than 0.25, e.g. lying in the range 0.01 to 0.2, is preferably less than or equal to 0.1, e.g. lying in the range 0.02 to 0.1, and more particularly is close to 0.05 to 0.04.

For ducts including a rectilinear length (or straight portion) of length of the order of 5 meters (m) to 25 m, for example, and including a bend fixed to the end of said straight portion, said fixing zone is situated either in a bend portion, or else in a zone of said straight portion situated at a distance from said end which is less than or equal to 2 m, e.g. 0.01 m to 2 m, and preferably less than or equal to 1 m, e.g. 0.05 m to 1 m.

The fluid(s) can be caused to flow along the duct either before or after, and preferably during, the application of vibration to the duct. The said fluid(s) may be constituted by one or more chemical reagents subjected to chemical reaction in said duct. Under such circumstances, the thermal enclosure may be a furnace or a reaction chamber or even a heat exchanger in which a chemical reaction takes place.

In preferred implementations of the invention:
said vibration is exerted in the vicinity of a bend in said duct which is shaped to follow a sinuous path comprising a succession of rectilinear lengths of tube extending along longitudinal axes that are vertical or horizontal, together with curvilinear lengths or bends interconnecting said rectilinear lengths;

said vibration is applied by exerting a force in a direction that is substantially radial relative to the longitudinal axes of said rectilinear length of tube and said mechanical link means is fixed in the vicinity of mechanical guidance or support means for said duct;

said mechanical link whereby said vibration is transmitted and applied to said duct is rigidly bonded or fixed in non-removable manner to said duct, e.g. at said bend of a sinuously-shaped duct;

the electromagnetic vibrator is powered by a variable frequency electricity supply (or a variable frequency converter) operating at a frequency that is less than or equal to 100 Hz, e.g. less that or equal to 50 Hz or 60 Hz;

a vibrator is used which is supported by (or suspended from) said mechanical link;

said vibrator exerts a (linear) periodic force at a frequency that is substantially equal to a natural frequency corresponding to a transverse vibration mode of said rectilinear length (equal to within ±15%, and preferably to within ±5%); and the vibration is applied to said duct at a frequency of less than 1000 Hz, preferably lying in the range 10 Hz to 100 Hz, e.g. lying in the range 20 Hz to 60 Hz.

The solution to the problem posed also consists in providing a device or apparatus for heat treating one or more fluids and comprising:
a thermal enclosure;
a duct along which said fluid(s) flow(s), said duct including at least one rectilinear length of tube extending along a longitudinal axis and optionally terminated by at least one bend (or curvilinear length of tube), and which extends at least in part inside said enclosure;
a mechanical vibrator disposed outside the thermal enclosure; and
mechanical link means (or bonding means or adaptor means) connecting said duct to said vibrator which is fixed to said duct in at least one fixing zone that extends in the vicinity of said bend or of one end of said rectilinear length, and in which the axis along which said vibrator exerts its force on said mechanical link means is disposed substantially transversely to the longitudinal axis of said rectilinear length of tube In preferred embodiments of the apparatus of the invention:
said vibrator is preferably fixed rigidly to said link means so that its main axis along which it applies force is disposed substantially radially relative to the longitudinal axis of the mechanical link;

at least one mechanical guidance or support means for said duct is disposed in the vicinity of said bend or of said rectilinear length of tube in a manner distinct from said mechanical link means;

said mechanical link means is rigidly fixed or linked in non-removable manner to said duct and is fixed by a flexible link (or a suspension such as a spring) to a stationary element disposed outside the enclosure; said flexible link making it possible to remove (or compensate) at least a portion of the mass of the mechanical link means so as to avoid generating additional mechanical stresses in the duct; the function of the mechanical link means is to transmit in full the vibration from the vibrator to the duct without significantly altering the frequency applied by the vibrator (due to a natural frequency of the mechanical link means);

at least a portion of said mechanical link means is welded to said duct, e.g. in the vicinity of one end of a rectilinear length of tube thereof, or else is integrally cast with a portion of said duct, such as a bend;

said mechanical link means (whereby vibration is transmitted) includes at least two and not more than six (e.g. three or four) elongate elements (such as tabs, lugs, or ribs) which are fixed (preferably welded) to a rectilinear length of tube forming a portion of the duct, in the vicinity of said bend or of an end of said length of tube; the elongate elements may be regularly or symmetrically distributed around the longitudinal axis of the rectilinear length of tube;

said mechanical link means further includes a portion that is hollow (tubular) and straight (rectilinear);

said mechanical link means comprises a set of parts that are welded together, including at least two parts constituted by different materials or alloys (e.g. of steel);

said mechanical vibrator is an electromagnetic vibrator powered by control means of variable frequency and voltage (to modify respectively the frequency and the amplitude of the vibration);

said mechanical vibrator is (rigidly) fixed to said mechanical link means by fixing and direction-imparting means which enable the axis on which vibration is applied and/or on which the reciprocating force generated by the mechanical vibrator is applied to be varied around an axis parallel to a rectilinear length of tube of said duct (in various substantially radial positions);

said mechanical link means is essentially constituted by a tube or a rod extending through an orifice provided in a wall forming a portion of the means defining the thermal enclosure, which link means is fixed to the vicinity of an end of the rectilinear length of tube or preferably to a bend disposed at said end, and said rectilinear length of tube extends substantially horizontally;

said mechanical link means includes a hollow length of tube defining a tubular space within which there extends a tube or rod forming a portion of means for fastening or suspending the duct to a stationary element disposed outside the enclosure, which length of tube extends through an orifice provided in a wall of the thermal enclosure, and said rectilinear length of tube extends substantially vertically;

the first natural frequency (i.e. the lowest frequency) corresponding to the first natural mode of deformation of the mechanical link (or connector) is greater (preferably at least 20% or 30%) than the first natural frequency of (transverse) deformation of the rectilinear portion of duct; by way of example, to make it possible to excite the duct at its natural frequency which is about 40 Hz, it is ensured that none of the mechanical link means has a natural frequency of less than 50 Hz, and preferably none less than 60 Hz or 70 Hz, and the frequency at which the vibrator generates vibration is set to a value of the order of 35 Hz to 45 Hz;

the ratio of the mass of said mechanical link means (between the vibrator and the duct) to the mass of said duct is less than 0.1 and preferably less than or equal to 0.05; and the greater dimension (or length) of said link means is less than or equal to 2 m, e.g. being about 1 m to 1.5 m.

The solution to the problem posed also consists in providing apparatus for applying vibration produced by a mechanical vibrator to a duct having at least a portion extending inside a thermal enclosure and including at least one rectilinear length of tube extending along a longitudinal axis and optionally terminated by at least one bend, which apparatus includes mechanical link means connecting the vibrator to the duct and having a (rigid) metal structure for transmitting vibration that is elongate in shape and comprises:

a tubular length, that is preferably hollow and of cylindrical section, or a plurality of tubular lengths assembled together in rigid manner (preferably in non-removable manner, preferably by welding);

a rigid mechanical fixing interface (or means) that is preferably removable or dismountable, e.g. by means of screws or bolts, between said vibrator and said structure, e.g. disposed at a first end of the metal structure; and a rigid mechanical fixing interface (or means) that is preferably not removable, e.g. by welding, between said structure and said duct, e.g. disposed at a second end of the metal structure, preferably to the bend or the vicinity of one end of said rectilinear length.

The methods and apparatuses of the invention are suitable for steam cracking hydrocarbons such as naphtha to produce olefins, or for cracking 1,2-dichloroethane to produce vinyl chloride.

In general, the invention is applicable to methods and apparatuses in which the fluids concerned are liable to give rise to solid deposits under the effect of heating, cooling, or chemical reaction.

By proposing to apply the vibrations generated by the mechanical vibrator via a link piece between the mechanical vibrator and the duct, and in which the link and vibration-transmission piece is fixed in the vicinity of a bend or an end of the rectilinear length of tube of the duct, it is possible to obtain such a link or vibration-transmission piece that is relatively short, and consequently small in size. Because of its small size, it is possible to minimize the diameter of the orifice that needs to be provided through the wall of the thermal enclosure to allow the link piece to extend therethrough from the mechanical vibrator which is located outside the enclosure (relative to said wall) to the duct which is disposed inside the enclosure (relative to said wall).

Because of the small dimensions of the vibration-transmission piece (or structure), and because of the non-removable nature of the mechanical link between said vibration-transmission piece and the duct, e.g. as obtained by welding or by casting, it is thus possible to obtain a mechanical link between the vibrator and the duct to be vibrated in which the link has very high mechanical stiffness (static and dynamic), while also obtaining a transmission piece that is relatively lightweight. By way of example, the mass of the adaptor shown in FIGS. 3 to 5 may be less than 100 kg, e.g. about 50 kg.

These advantages can also be amplified by choosing to make the vibration-transmission piece by assembling together (welding) a plurality of pieces made out of different materials, thereby also making it possible to adapt the design of the piece to the various temperatures to which the various portions thereof will be subjected, i.e. a first material specially adapted for withstanding high temperatures that obtain inside the thermal enclosure, and a second material for the portion of the piece that is disposed in the vicinity of the wall or outside the thermal enclosure, where temperatures are closer to normal ambient temperature.

The preferred choice of a mechanical vibrator of the electromagnetic type makes it possible to propose such vibrators that are of very low cost, very compact, of low mass, very robust, capable of operating continuously, and capable of applying relatively large forces to the duct via the transmission piece, e.g. forces of the order of several tens of Newtons.

In this type of mechanical vibrator which is powered by AC and biased by a permanent magnet, the force delivered by the alternating magnetic field is used to produce an oscillating displacement in a given direction, and the working frequency (i.e. the frequency at which vibrations are produced) is equal to the frequency at which the electricity is supplied, which electricity is preferably made to be adjustable (or variable) independently both in frequency and in voltage or current by driving the electromagnetic vibrator from an inverter or variable supply.

By proposing to apply vibration that is the result of a force that is of adjustable modulus, and preferably of direction that is also adjustable, it is possible to impart vibration to the duct with an amplitude that is necessary and sufficient to reduce or avoid deposition of by-products on the inside wall of the tube or duct disposed in the thermal enclosure. The above-described means make it possible to adjust the excitation frequency (i.e. the frequency of vibration) applied to the duct as a function of the natural frequencies of the tube (or duct) and as a function of the natural frequencies of the vibration-transmission piece. This manner of imparting vibration adjustably in terms of modulus, of frequency, and of direction, is particularly favored by the characteristics of the invention.

The enclosure may contain one or more tubes having a single inlet and a single outlet for a fluid, i.e. for a single-pass process; alternatively, the enclosure may contain a plurality of tubes in a plurality of sets, each set having its own fluid inlet or an inlet that is common to a plurality of tubes, and each tube likewise being provided with its own fluid outlet or with an outlet that is common for a plurality of tubes. The enclosure may contain two to four sinuously-shaped tubes, each provided with an individual inlet and with an outlet that is individual or common to a plurality of tubes. The enclosure may be heated by burners which may be disposed in a bottom portion thereof (in a "sole plate" zone thereof) and/or along one or more sides. It is advantageous for the burners to be disposed parallel to the longitudinal axes of the rectilinear tube portions and/or perpendicular to the plane containing the longitudinal axes of various rectilinear sections of tubes. The burners may also be disposed in such a manner that their flames extend along axes parallel to the axes of the rectilinear tube portions, with the flame axes being collinear or spaced apart from the axes of rectilinear tube portions. The enclosure may be constituted by a cracking furnace such as a hydrocarbon steam cracking furnace, which hydrocarbons may be gaseous at ambient temperature or liquid, such as naphtha. Such substances and methods of thermal cracking are described in U.S. patent applications 08/463,032 filed Jun. 5, 1995, now U.S. Pat. No. 5,763,724 and 08/462,672 now U.S. Pat. No. 5,846,496 filed Jul. 27, 1995, which are incorporated in the present application by reference. The enclosure may also be used as a heat exchanger for heating or cooling a fluid flowing along the duct.

The duct may include one or more rectilinear portions, e.g. two to twenty rectilinear portions connected in parallel or in series and interconnected by at least one bend which may be a 90° bend or a 180° bend. The rectilinear tube portions may extend parallel to one another. Under such circumstances, a plurality (e.g. two to six) of rectilinear portions may be connected, at least in part, to a common manifold, which may be situated outside or preferably inside the enclosure.

The duct preferably includes at least two and preferably at least three and not more than twenty rectilinear tube portions interconnected by bends extending substantially through 180°, such that at each bend the flow of fluid flowing along the duct reverses direction relative to a fixed frame of reference, such as a partition of the enclosure. Under such circumstances, the duct is preferably sinuous in form or in the form of a bundle. The rectilinear tube portions may be disposed horizontally or vertically, and certain portions may be disposed vertically while others are disposed horizontally, which others are shorter than the vertically-disposed rectilinear portions, the ratio in length of short sections to long sections lying, for example, in the range about 0.05 to about 0.2. The rectilinear tube portions and/or the bends may have different diameters from place to place. Preferably, the rectilinear tube portions and the bends are identical in diameter. Alternatively, the tube diameter may vary along the tube and/or along the duct, from an inlet section to an outlet section in a manner that is progressive or digressive. The rectilinear tube portions may be of a length lying in the range 2 m to 25 m, e.g. in the range 5 m to 20 m.

The connector or adaptor, i.e. the mechanical structure for transmitting the vibrations produced by the vibrator to the rectilinear tube sections or to the tube bends is disposed between the vibrator and the duct. This transmission structure or adaptor is preferably fixed to or else forms an integral portion of, a duct, and more partially forms an integral portion of one or more rectilinear tube sections of the duct, extending at least one or two meters from a bend, even though the transmission structure can be fixed or form an integral portion of a duct bend. The vibration-transmission connector(s) may be fixed to the duct at a single fixing zone or point, but the apparatus is preferably provided with a plurality of fixing zones or points, preferably at least two such zones, e.g. not more than six fixing zones, e.g. disposed symmetrically about the tube or duct. The fixing zone(s) is/are spaced apart from welds interconnecting two tube portions. The transmission structure or adaptor is preferably fixed at one or more fixing zones to the rectilinear tube portion on either side of a bend extending through 180°, particularly for a duct that comprises vertical rectilinear tube portions. Each vibration-transmission structure or adaptor may be connected to a respective vibrator disposed outside the enclosure and may consequently extend through a respective orifice provided through the wall of the enclosure for each vibration-transmission adaptor or structure when the adaptors or structures extend inside the enclosure. Alternatively, a plurality of adaptors for transmitting vibration to the duct are assembled together mechanically and to one or more vibrators, so as to reduce the number of orifices that are required through the walls of the enclosure.

BRIEF DESCRIPTION OF THE DRAWINGS

The numerous advantages provided by the invention will be better understood from the following description which refers to the accompanying drawings, which show preferred embodiments of the invention, without the invention being limited thereto.

Unless specified to the contrary, identical numerical references in the various figures designate elements that are identical or similar.

MORE DETAILED DESCRIPTION

Figure 1:
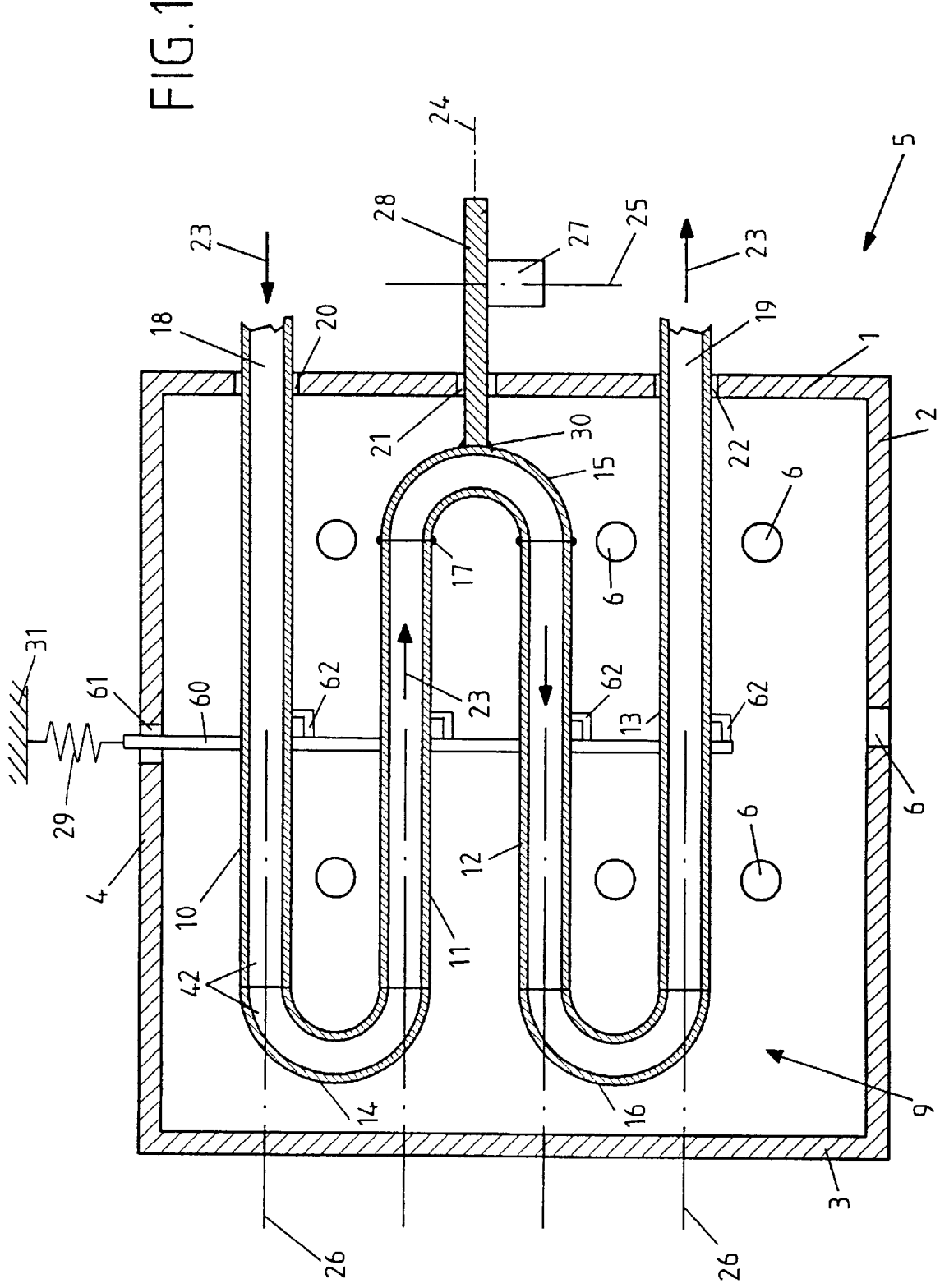
FIG. 1 is a diagrammatic section view on a vertical plane, for example, through apparatus of the invention for thermally cracking hydrocarbons and comprising a furnace provided with burners and fitted with a system for imparting vibration to a sinuously-shaped duct along which there flow the hydrocarbons which are to be subjected to the cracking reaction.
Figure 2:
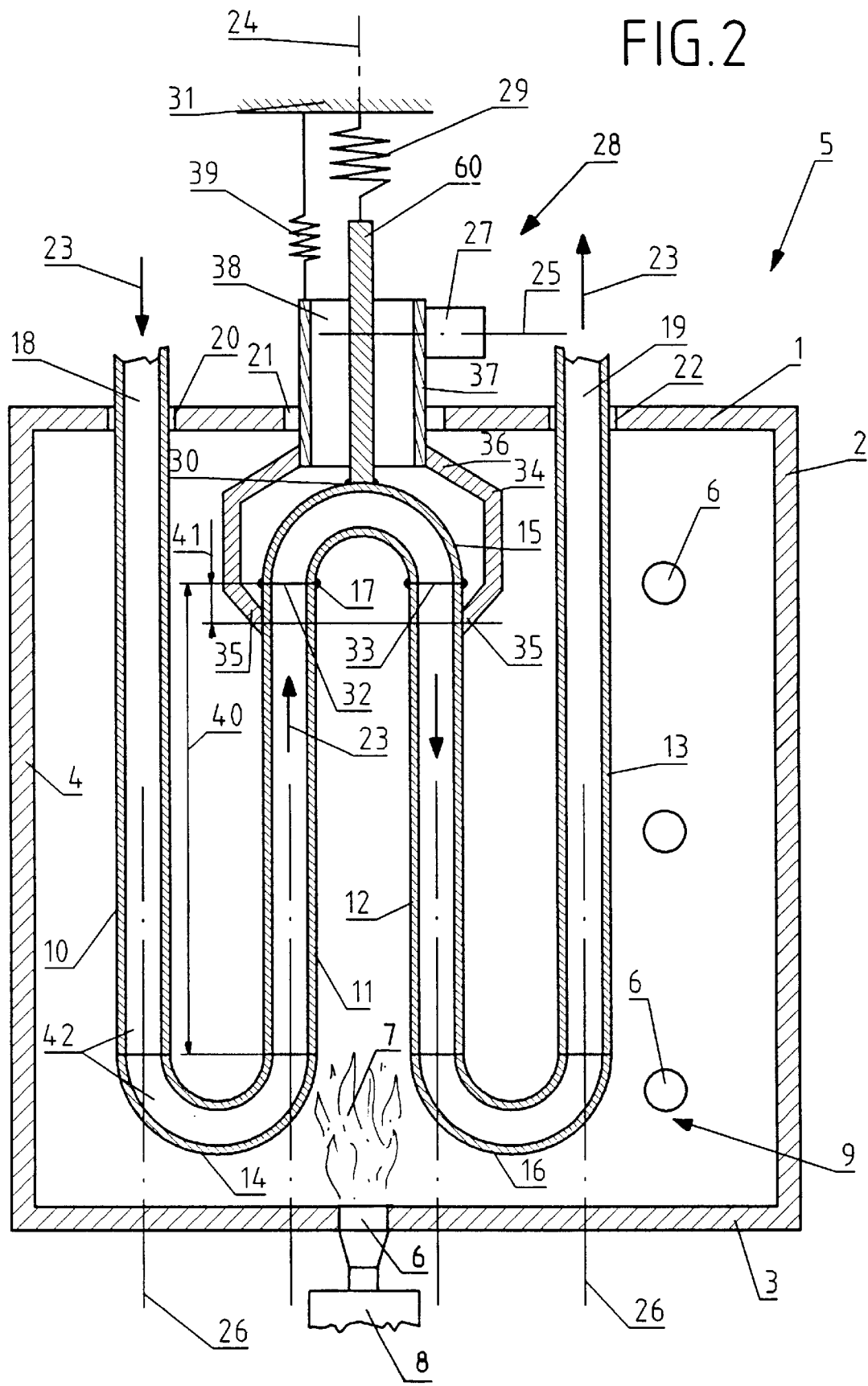
FIG. 2 is similar to FIG. 1 and shows a variant embodiment of the means for imparting vibration to the sinuously-shaped duct.

With reference to FIGS. 1 and 2 in particular, the thermal enclosure such as a hydrocarbon-cracking furnace, is defined by four walls referenced 1, 2, 3, and 4, defining said enclosure 5.

The enclosure 5 contains a duct 9 in the form of a sinuous pipe 42 having an inlet 18 via which substances that are to be subjected to heat treatment inside the enclosure 5 penetrate along arrow 23, which substances flow in the directions marked by arrows 23 to an outlet 19 from the duct 9. As shown in FIGS. 1 and 2, the duct 9 is essentially constituted by a "coil" made up of four straight (rectilinear) lengths of tube 10, 11, 12, and 13 which are assembled to one another by three bends 14, 15, and 16.

Figure 3:
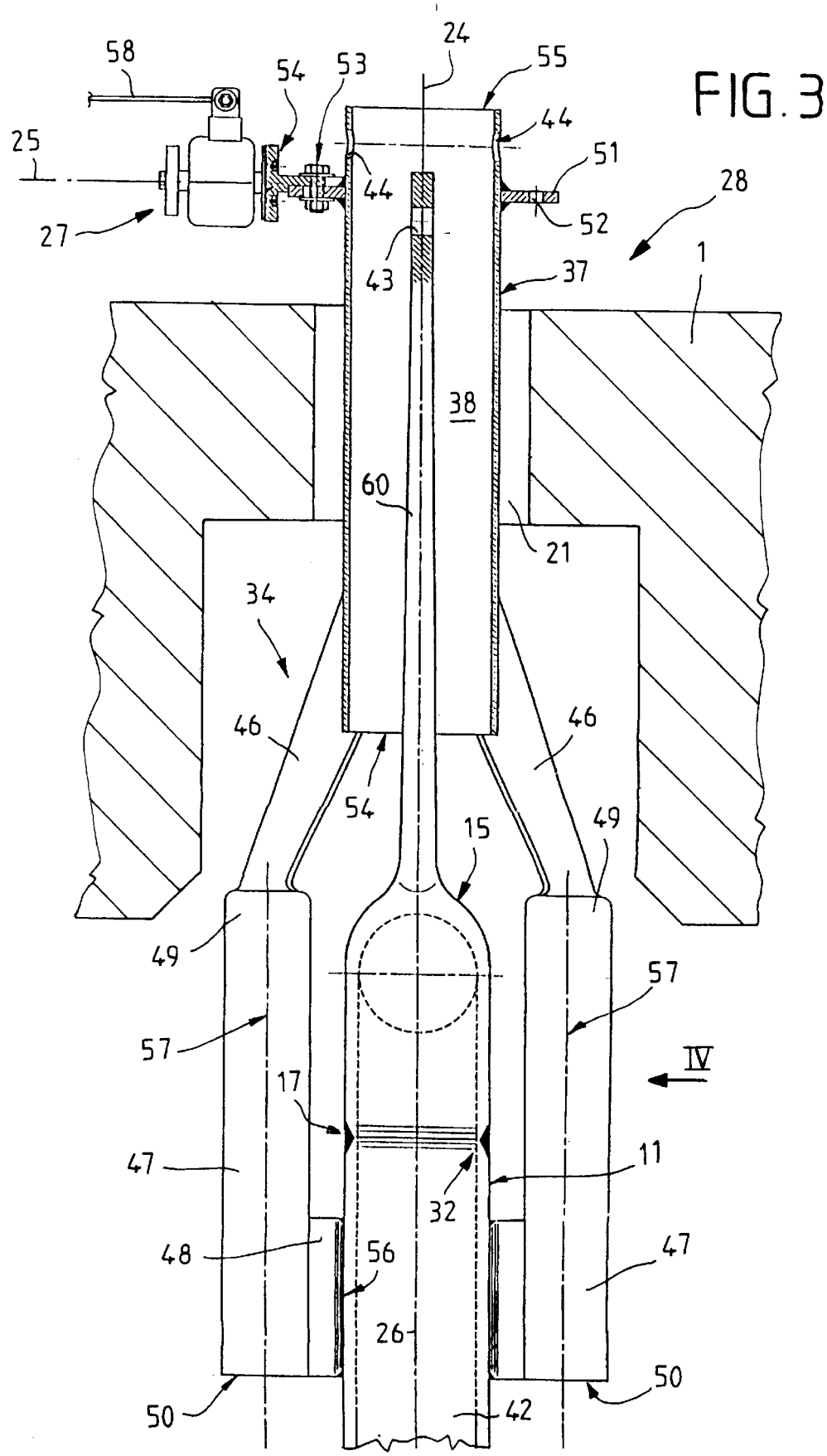
FIG. 3 shows an embodiment detail of the means for transmitting vibration as shown diagrammatically in FIG. 2.
Figure 4:
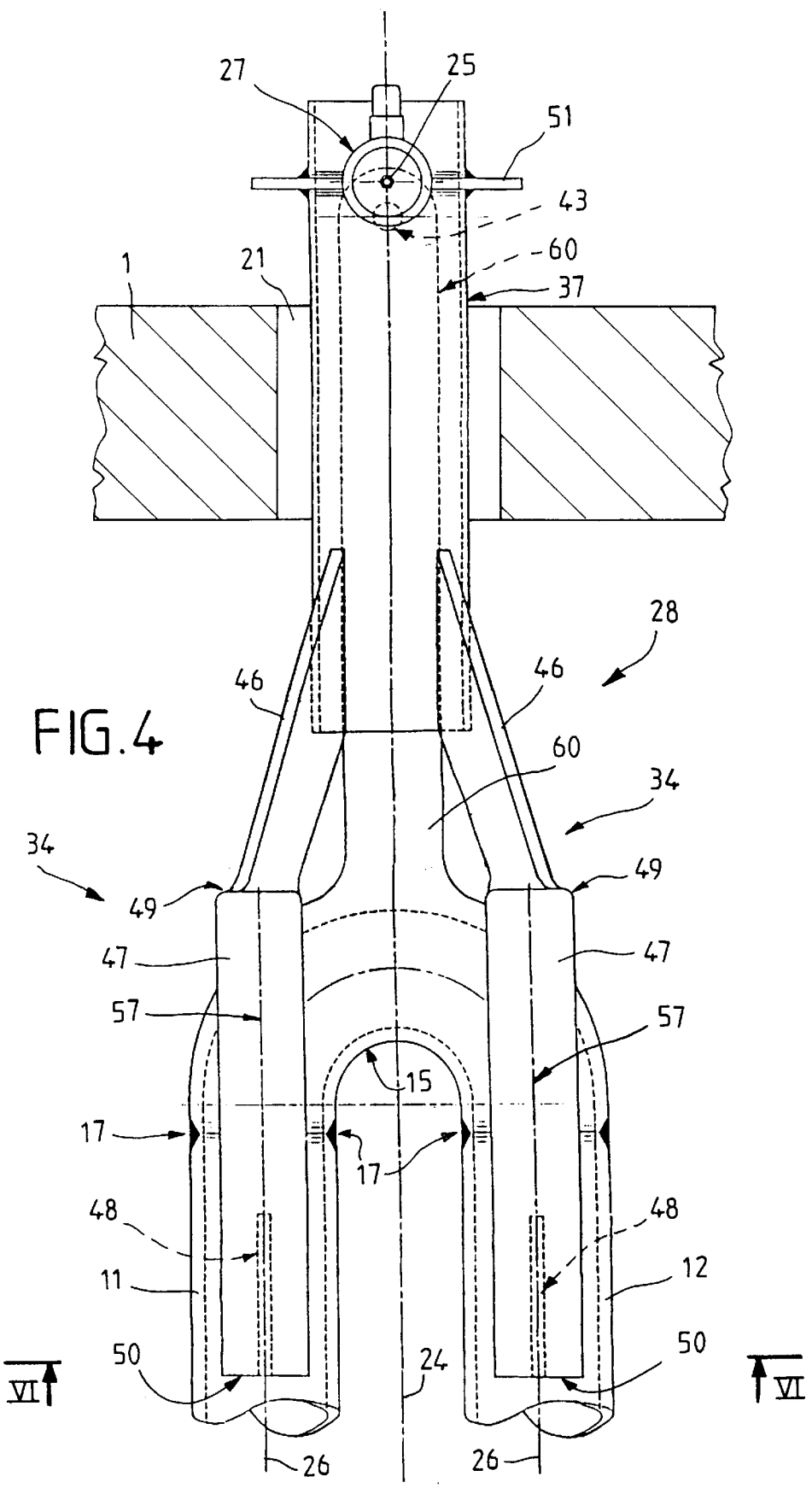
FIG. 4 is a section on IV of FIG. 3.

The rectilinear lengths of tubes 10 to 13 extend along the respective longitudinal axes referenced 27 that are parallel to one another and vertical in the embodiment shown in FIGS. 2 to 4 or horizontal as shown in the embodiment of FIG. 1.

The walls defining the enclosure 5 are provided with a plurality of orifices 6. In FIG. 2, there is a diagram of a burner 8 disposed outside the enclosure 5 in line with one of the orifices 6 and producing flames 7 at the outlet from the orifice 6 (i.e. on the inside of the enclosure 5), which flames 7 heat the inside of the enclosure 5 by radiation, in particular, and more particularly they heat the duct 9 along which the substance(s) to be subjected to heat treatment flow.

The duct 9 is made of a material such as a steel that is specially chosen in particular to withstand high temperatures (e.g. lying in the range about 500° C. to 1150° C., and possibly as high as 1500° C.) that exist inside the enclosure 5 so as to enable the temperature of the fluid(s) flowing along the duct to be maintained at a temperature that generally lies in the range 250° C. to 1100° C. As shown diagrammatically in FIGS. 1 to 4, the various elements (bends or straight lengths of tube) making up the duct 9 are assembled together by welds, such as those shown diagrammatically and referenced 17, which welds are provided at the interfaces or junctions between the straight lengths 11 and 12 and the bend 15 shown in FIGS. 1 to 4.

Three orifices 20, 21, and 22 are provided through the wall 1 of the enclosure 5 serving respectively to pass the first rectilinear length 10 of duct 9 through the wall 1 (via the orifice 20), to pass a device 28 for transmitting vibration from a vibrator 27 to the duct 9 (via the orifice 21), and to pass the last rectilinear length 13 of the duct 9 (via the third orifice 22).

As shown in FIG. 2, an elongate element 60 for supporting the duct 9, e.g. a vertical axis rod or tube 24, extends through said orifice 21 and is securely fixed in non-removable manner (e.g. welded) via its base or bottom portion 30 to the central or top portion of the bend 15. The rod 60 serves to support and suspend a portion of the duct via the bend 15, in particular by means of a flexible link 29 such as a spring or equivalent suspension means, connecting the top end of the rod 60 to a stationary part or installation 31 situated outside the enclosure 5.

In the embodiment shown in FIG. 2, the reciprocating forces or vibration generated by the vibrator 27 along radial axis 25 perpendicular to and intersecting the axis 24 are applied to the duct via an adaptor 28 which comprises a length of tube 37 with the vibrator fixed on the periphery thereof at a portion of the tube 37 that is located outside the enclosure 5. The tube 37 extends along the vertical axis 24 and defines a space 38 within which the duct support rod 60 extends.

The length of tube 37 is of great stiffness and extends through the orifice 21 provided in the wall 1, being extended at its bottom end by tags or lugs or ribs 34, e.g. having their top ends 36 welded to the base of the length of tube 37 (reference 54 in FIG. 3), and which are likewise welded at their bottom ends 35 to the rectilinear lengths of tubes 11 and 12 in zones thereof close to their respective top ends 32 and 33, via which said lengths of straight tube are welded to the bend 15.

The distance 41 measured between the top ends 32 and 33 of the lengths of tube 11 and 12 and the zones of said lengths of tube to which the bottom ends 35 of the tabs 34 of the vibration transmission means are fixed is preferably less than one-fourth (and preferably less than one-tenth) of the length 40 of said rectilinear lengths of tube 11 and 12.

As shown in FIG. 2, the means 28 for transmitting vibration from the generator 27 to the duct 9 and essentially comprising said length of tube 37 and said elongate tabs or elements 34, can also be connected to said external stationary apparatus 31 via second flexible suspension means 39, e.g. such as a spring.

In the embodiment shown in FIG. 1, the vibrator 27 is fixed directly to the portion of the connector 28 which extends outside the enclosure 5 to transmit thereto the vibration generated by the vibrator 27, which vibration is transmitted via the connector 28 to the bend 15 and consequently to the duct 9, and particularly to the rectilinear length of tube in which there flows the substance that is to be subjected to heat treatment in the enclosure 5. The reciprocating forces applied to the connector by the vibrator 27 are directed along an axis 25 that preferably extends radially relative to the longitudinal axis 24 of the connector 28.

In this embodiment, the connector 28 is essentially constituted by a rigid rod for transmitting the vibration produced by the vibrator to the bend 15 of the duct. The duct is fixed and held inside the enclosure 5 by support means comprising a vertical rod 60 extending through an orifice 61 provided in the wall 4 of the enclosure. The rod 60 is fixed to a support element 31 outside the enclosure, via the top end of the rod and via a flexible mechanical link 29. Four tabs 62 are fixed along the bottom portion of the rod 60 and have resting thereon and/or are fixed to the straight/horizontal lengths 10, 11, 12, and 13 of the duct 9.

Figure 5:
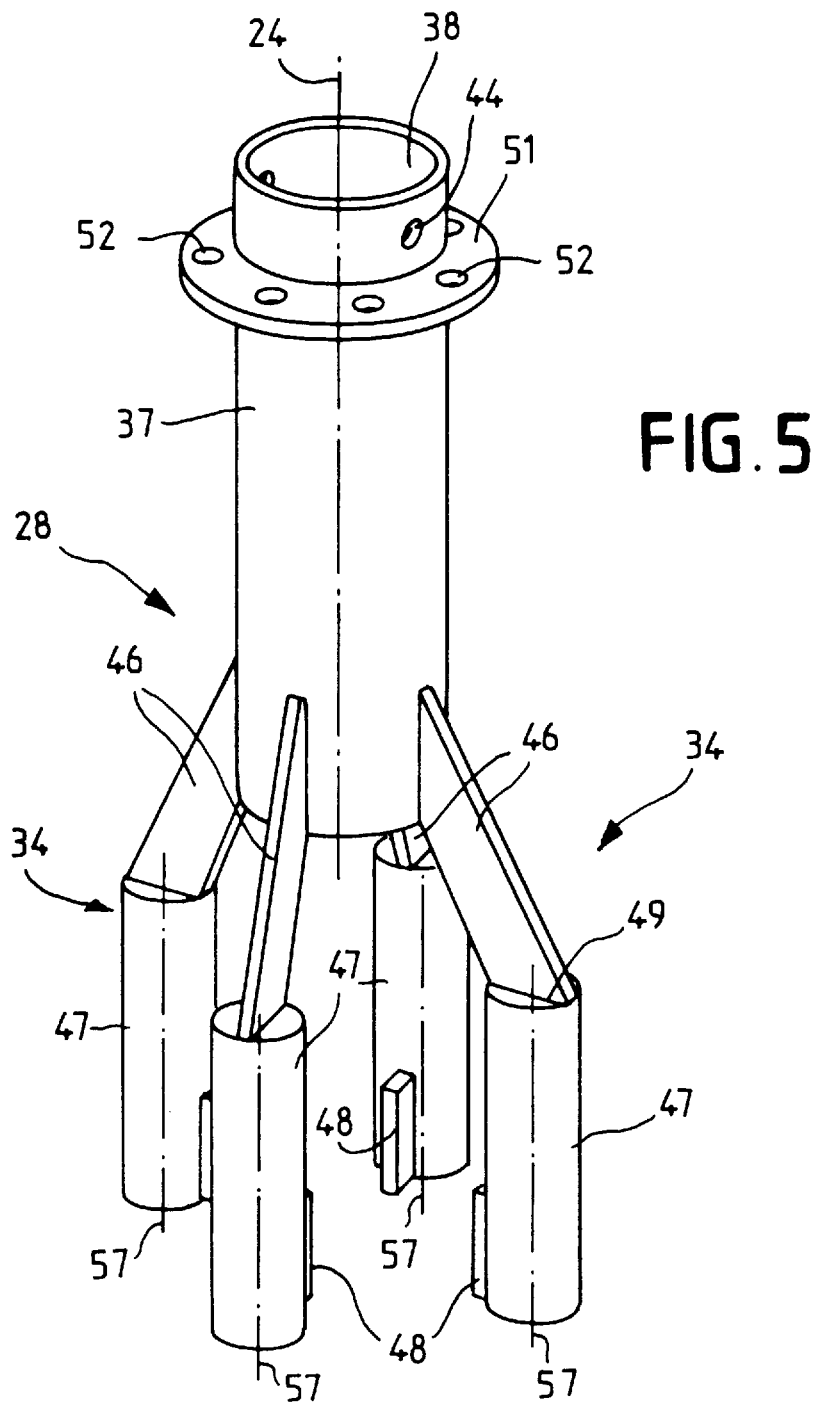
FIG. 5 is a diagrammatic perspective view of an adaptor (i.e. the part or structure for transmitting vibration) similar to that of FIGS. 3, 4, and 6.

With reference to FIGS. 3 to 5, the rod 60 forming a portion of the means for suspending the duct from stationary apparatus external to the thermal enclosure defined in particular by the wall 1 and which extends through the orifice 21 provided in said wall, forms an integral portion of the bend 15, e.g. because the part constituted by said bend and said rod is obtained by casting. The rod 60 is provided at its top end with an orifice 63 for fixing the suspension means referenced 29 in FIGS. 1 and 2, and enabling a mechanical link to be established between the end of the rod and the stationary apparatus 31 outside the enclosure 5. The vibration generator 27 is preferably constituted by an electromagnetic vibrator and is in the form of a housing powered with variable-frequency AC from an electricity generator (not shown) via a power cable 58, and it is fixed via a flange 54 and a bolt 53 to another flange 51 welded around the length of tube 37 on a portion thereof that extends outside the enclosure, i.e. outside the wall 1 defining the enclosure. The flange 51 is provided with a plurality of orifices 52 enabling the vibrator 27 to be fixed by bolts 53 which are distributed around the perimeter of the flange 51 so as to make it possible to select the direction of the substantially radial axis 25 that is perpendicular to the axis 24 and along which vibration or reciprocating forces are exerted by the vibrator 27 on the length of tube 37.

This length of tube 37 which extends through the orifice 21 and within which there extends the rod 60 is extended downwards, as described above with reference to FIG. 2, by elongate elements 34 which, in FIGS. 3 and 4, are four in number and are disposed substantially symmetrically about two planes respectively perpendicular to the planes of FIGS. 3 and 4 and including the axis 24 along which the support rod 60 extends. In the embodiment of FIGS. 3 to 6, each of the elongate elements comprises a plate 46 whose top end is welded to the bottom portion 54 of the length of tube 37 and whose bottom end is welded to the top end 49 of a respective length of tube 47, with the bottom ends of each of them being welded to respective other plates 48 each having a longitudinal edge 56 extending along a generator line of one of the lengths of tube 11 and 12 of the duct. These edges 56 of the plates 48 are welded to the corresponding lengths of tube.

It can thus be seen that the elongate elements 34 are welded in the vicinity of the top ends of the lengths of tube 11 and 12, i.e. in the vicinity of the welds 17 connecting said lengths of tube 11 and 12 to the bend 15 which interconnects said two lengths of tube 11 and 12.

The lengths of tube 47 forming portions of the elongate link elements 34 of the structure for transmitting vibration from the vibrator 27 to the duct extend along mutually parallel longitudinal axes 57 that are also parallel to the axis 24 along which the length of tube 37 extends, and along which the rod 60 for suspending the bend 15 also extends. The top portion of the length of tube 37 includes radial orifices 44 in the vicinity of its top end 55 enabling suspension means such as those referenced 39 in FIG. 2 to be fixed to said end 55.

Figure 6:
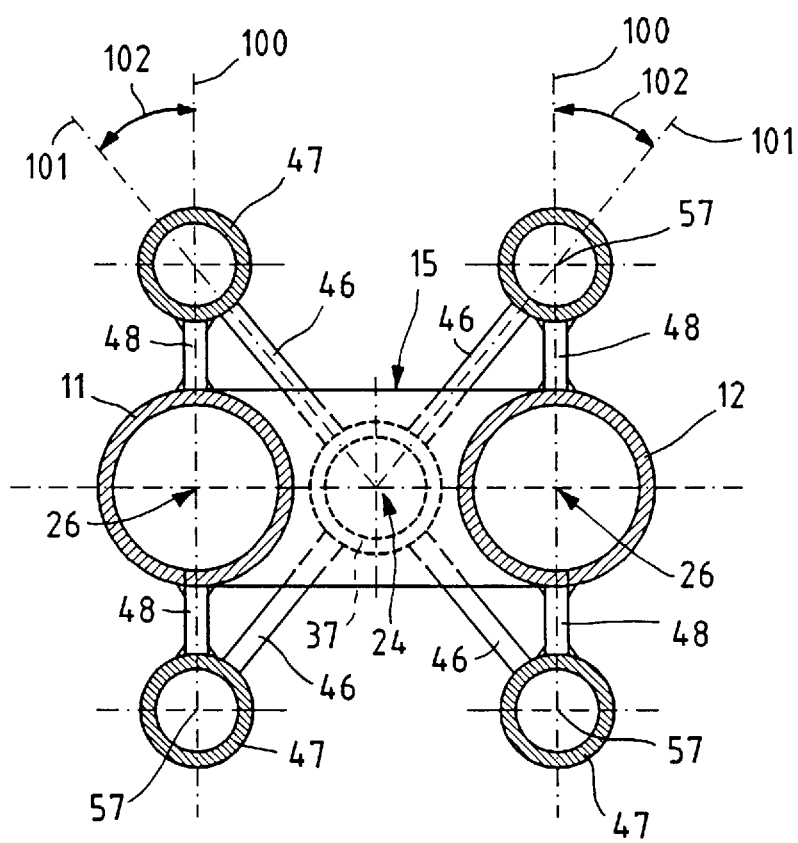
FIG. 6 is a section view on a transverse plane marked VI—VI in FIG. 4, showing how the transmission structure is fixed to two rectilinear portions of a duct (which portions are interconnected by a 180° bend).

A transmission structure 28 may have two to six (e.g. four as shown in FIGS. 5 and 6) link arms (or elongate elements) 34, which are preferably disposed symmetrically. Each elongate element (or link arm) 34 and/or said structure may include a tab or lug or flange extending around at least a portion thereof and to which the vibrator is attached. In a preferred embodiment, this structure may be constituted by a simple length of hollow tube or a ring 37 which extends through an orifice provided in a wall of the enclosure, and inside which there extends a support for the duct which is spaced apart from the structure 28, 37.

The elongate elements 34 connecting the ring 37 to the duct may be of substantially constant thickness, e.g. being in the form of curved arms. Each elongate link element 34 preferably includes a first plate or fin 46 connecting the ring 37 to a length of hollow tube or rod 46 which is in turn fixed to the duct to be vibrated by means of a respective second plate or fin 48. When the duct includes vertical tube portions, said first fin 46 is disposed at the top of the length 47 and the second fin is disposed at the bottom of the length 47, as shown in FIG. 5.

As shown in FIG. 5, the internal portions of the plates or fins 46 and 48 preferably face the ring 37, extending outside a cylinder constituting the envelope of the ring 37.

Alternatively, the top fins 46 may face the ring 37 via their outside portions, so that they themselves extend inside the cylinder forming the envelope of the ring 37.

The direction in which the second fins 48 are fixed to the rectilinear portions of the duct on either side of a bend in the duct can be parallel to the longitudinal axis of the rectilinear portion of each duct (and preferably transversely relative to said axis), and where appropriate parallel to the plane containing the axes of a plurality of rectilinear duct portions.

The direction 101 (FIG. 6) along which the top fins 46 are fixed to the ring 37 can coincide with or be parallel to the direction 100 on which the bottom fins 48 are fixed to the ducts 11 and 12, however the directions 101 along which all of the top fins are fixed are preferably different from any of the directions 100 along which any of the bottom fins are fixed, and they preferably differ by an angle 102, as shown in FIG. 6.

Such embodiments of the means for transmitting vibration to the duct, in vibration-application zones disposed on either side of a bend, and including said first and second plates or fins, make it possible to obtain a structure whose mass is low but whose stiffness is high enough for the frequency of the first natural deformation mode to be greater than the frequency at which the duct is excited by the vibrator (e.g. more than twice said frequency).

The inverter powering the vibrator may be selected from those put on the market by TELEMECANIQUE (incorporated in France).

In an embodiment of the adaptor 28 as shown in FIGS. 3 to 5:

the four elongate elements 34 are identical, and each is constituted by a length 47 of tube having an outside diameter of 80 mm, a thickness of 6 mm, and a length of 450 mm, associated with a plate 46 having a thickness of 12 mm; and the length of tube 37 has an outside diameter of 145 mm, a thickness of 6 mm, and a length of 580 mm.

The metal structure of the adaptor (constituted by these parts being assembled together by welding) is about 1200 mm long and its mass together with that of the vibrator is about 55 kg.

It is claimed:

1. Apparatus for applying heat treatment to one or more fluids, the apparatus comprising:

a thermal enclosure;

a duct in which said fluid(s) flow(s), the duct including at least one rectilinear length extending along a longitudinal axis terminated by at least one bend, and extending, at least in part, inside said enclosure;

a mechanical vibrator disposed outside the thermal enclosure;

mechanical link means connecting said duct to said vibrator;

wherein said mechanical link means is fixed to said duct at said bend or in the vicinity of one end of said rectilinear length, and wherein an axis along which said vibrator exerts its force on said mechanical link means is substantially transverse to the longitudinal axis of said rectilinear length; and at least one mechanical guidance and support means for said duct affixed thereto in the vicinity of said bend or said end of the rectilinear length of said duct in a manner that is distinct from said mechanical link means.

2. Apparatus according to claim 1, in which said vibrator is fixed to said mechanical link means in such a manner that its main force-application axis is substantially transverse relative to the longitudinal axis of the mechanical link means.

3. Apparatus according to claim 1, in which said mechanical link means is rigidly fixed to said duct in non-removable manner, and said vibrator is rigidly fixed to said mechanical link means, and is supported thereby.

4. Apparatus according to claim 3, in which a portion of said mechanical link means is welded to said duct, or is cast simultaneously with a portion of said duct.

5. Apparatus according to claim 1, in which said mechanical link means include a set of welded-together parts, at least two of which parts are made of different materials.

6. Apparatus according to claim 1, in which said vibrator is an electromagnetic vibrator which is powered by variable frequency and voltage control means.

7. Apparatus according to claim 1, wherein said mechanical link means is fixed to said duct at said bend.

8. Apparatus for applying heat treatment to one or more fluids, the apparatus comprising:

a thermal enclosure;

a duct in which said fluid(s) flow(s), the duct including at least one rectilinear length extending along a longitudinal axis terminated by at least one bend, and extending, at least in part, inside said enclosure;

a mechanical vibrator disposed outside the thermal enclosure;

mechanical link means connecting said duct to said vibrator;

wherein said mechanical link means is fixed to said duct at said bend or in the vicinity of one end of said rectilinear length, and wherein an axis along which said vibrator exerts its force on said mechanical link means is substantially transverse to the longitudinal axis of said rectilinear length; and at least one mechanical guidance and support means for said duct affixed thereto in the vicinity of said bend or said end of the rectilinear length, and wherein said mechanical link means includes at least two elongate elements, which are fixed to said duct at said bend or in the vicinity of one end of said rectilinear length, and a straight tubular portion which is extended by said elongate elements.

9. Apparatus according to claim 8, wherein said mechanical link means is fixed to said duct at said bend.

10. Apparatus for applying heat treatment to one or more fluids, the apparatus comprising:

a thermal enclosure;

a duct in which said fluid(s) flow(s), the duct including at least one rectilinear length extending along a longitudinal axis terminated by at least one bend, and extending, at least in part, inside said enclosure;

a mechanical vibrator disposed outside the thermal enclosure;

mechanical link means connecting said duct to said vibrator;

wherein said mechanical link means is fixed to said duct at said bend or in the vicinity of one end of said rectilinear length, and wherein an axis along which said vibrator exerts its force on said mechanical link means is substantially transverse to the longitudinal axis of said rectilinear length; and at least one mechanical guidance and support means for said duct affixed thereto in the vicinity of said bend or said end of the rectilinear length, and wherein said mechanical link means includes a straight tubular portion defining a tubular space within which there extends a rod forming a portion of the mechanical guidance or supporting means for the duct, in which the tubular portion extends through an orifice provided in a wall of the thermal enclosure, said rectilinear length of duct extending substantially vertically.

11. Apparatus according to claim 10, wherein said mechanical link means is fixed to said duct at said bend.

* * * * *